United States Patent [19]

Lange et al.

[11] Patent Number: 6,087,455

[45] Date of Patent: Jul. 11, 2000

[54] PROCESS FOR HYDROGENATION OF MACROMOLECULAR ORGANIC SUBSTRATES

[75] Inventors: Jean-Paul Lange; Lodewijk Schoon, both of Amsterdam, Netherlands

[73] Assignee: Shell Oil Company, Houston, Tex.

[21] Appl. No.: 09/213,785

[22] Filed: Dec. 17, 1998

[30] Foreign Application Priority Data

Dec. 19, 1997 [EP] European Pat. Off. .............. 97310322

[51] Int. Cl.$^7$ ........................................... C08F 8/04
[52] U.S. Cl. ................... 525/338; 525/328.6; 525/332.8; 525/332.9; 525/331.1; 525/332.2; 525/437; 525/450; 525/471
[58] Field of Search ..................... 525/338, 339, 525/437, 450, 471

[56] References Cited

U.S. PATENT DOCUMENTS

| | | | |
|---|---|---|---|
| 2,152,533 | 3/1939 | Camody | 260/32 |
| 4,358,566 | 11/1982 | Ver Strate | 525/339 |
| 5,028,665 | 7/1991 | Hucul | 525/339 |
| 5,110,779 | 5/1992 | Hucul | 502/185 |
| 5,378,767 | 1/1995 | Massie | 525/339 |
| 5,936,128 | 8/1999 | Ruhl et al. | 564/451 |

FOREIGN PATENT DOCUMENTS

| | | |
|---|---|---|
| 0114704 B2 | 8/1984 | European Pat. Off. . |
| 0233642 | 2/1987 | European Pat. Off. . |
| 389656 | 4/1921 | Germany . |
| 2845615 | 4/1979 | Germany . |
| 3046251 A1 | 9/1982 | Germany . |

OTHER PUBLICATIONS

Database WPI, Section Ch, Week 9701, Derwent Publications Ltd., London, GB, Class D23, AN 97–007455 XP002104335 & JP 08 277238 A (Kuraray Co., Ltd.), Oct. 22, 1996 (Abstract).

*Primary Examiner*—Bernard Lipman
*Attorney, Agent, or Firm*—Donald F. Haas

[57] ABSTRACT

A process for the hydrogenation of a macromolecular organic substrate which process comprises contacting the organic substrate at elevated temperature and at elevated pressure with a catalyst comprising a hydrogenating metal or precursor thereof in the form of a megaporous structure having megapore diameter in excess of 10 micron.

15 Claims, No Drawings

PROCESS FOR HYDROGENATION OF MACROMOLECULAR ORGANIC SUBSTRATES

FIELD OF THE INVENTION

The present invention relates to a process for the catalytic hydrogenation of macromolecular organic substrates. More specifically the present invention relates to a heterogeneous process for the catalytic hydrogenation of macromolecular organic substrates in fixed bed operations.

BACKGROUND OF THE INVENTION

Processes for hydrogenation of organic substrates are well known. A particular class of organic substrates which it is desirable to hydrogenate is the class of oligomers and polymers and in particular of the subclass of elastomers. The polymer SBS (styrene-butadiene-styrene) has been commercially hydrogenated for some 25 to 30 years, and sold as a higher added value range of elastomers with improved stability.

Polymer SBS is soluble in organic solvents to give a highly viscous solution (so-called polymer cement) offering huge steric hindrance to catalysts. Accordingly hydrogenation processes to date have employed colloidal nickel/aluminium catalysts contacted at 80° C. and 60 bar hydrogen with the dissolved elastomer. Unfortunately the catalyst system is prone to formation of metal residues during the reaction stage, which remain in the polymer cement and contaminate the product. Accordingly a subsequent stage is usually employed for the removal of metal residues. Efforts to date have concentrated on minimizing the level of ash in the product. Nevertheless metal residue removal stages remain singularly responsible as the major contributor to capital costs of these commercial systems.

Previous attempts to employ catalysts which are not prone to residue formation have been less than successful. Heterogeneous catalyst systems were found to show low activities which had to be compensated by increased reaction temperatures in the order of 200° C. Unfortunately, reaction under these conditions resulted in deterioration of the molecular weight of the product, and in the contamination of the product with metal resulting from catalyst attrition. In U.S. Pat. No. 5,378,767 is described a process comprising a fixed bed hydrogenation of polydiene polymers of MW of up to 10,000, wherein the fixed bed comprises platinum, palladium or a mixture of the two supported on an alpha alumina support mm-size particles in fixed bed at elevated temperatures of the order of 200° C. with high conversion. However it was noted that some polymer degradation was observed due to the severe conditions employed.

Heterogeneous processes are known for the hydrogenation of low MW organic substrates. The heterogeneous process of EP 0 233 642 aims to improve selectivity of hydrogenation of low molecular weight, non-viscous substrates, comprising vegetable oils of MW in the range 600 to 1400 and viscosity typically in the region of or less than 10 cps at an operating temperature in the region of 135° C. The oils which are thought to become trapped in fixed bed catalyst structures, saturated with hydrogen and fully hydrogenated can be instead partially hydrogenated with catalysts comprising foils or honeycombs, which provide easy exit of the intermediate partially hydrogenated product. Accordingly this publication teaches only that foil and honeycomb catalysts can give the improvement in selectivity of conversion of the low molecular weight, low viscosity feed but gives no information about their suitability for converting higher MW (of the order of ×100) higher viscosity (of the order of ×100) substrates.

Organic substrates such as oligomers and polymers and in particular the sub class of elastomers are moreover sensitive to non-selective hydrogenation resulting in deterioration of physical and chemical properties and the like.

From U.S. Pat. Nos. 5,028,665 and 5,110,779 there is known a heterogeneous catalyst comprising a Group VIII metal and a porous support, wherein the porous support is characterised by a pore size distribution such that at least 95% of the pore volume is defined by pores having diameters greater than 450 angstroms and the ratio of metal surface area to carrier surface area is in the range from about 0.07 to 0.75:1. These processes, however, use catalyst particles having relatively small particle sizes of 10 to 20 microns that are slurried in the polymer solution and although they may be separated from the solution of the hydrogenated polymer by conventional methods such as precipitation or centrifugal separation of filtration, separation of the catalyst and its fines from the highly viscous polymer solution will be no minor task and hardly perfect.

Finally processes are known for the hydrogenative conversion of organic substrates to obtain further useful products having different characteristic chemical and physical properties. For example it is known to convert polyketones to polyalcohols with use of conventional hydrogenation catalysts.

Accordingly there is a need for a hydrogenation process for organic substrates which is capable of hydrogenation in selective manner of a wide range of substrates, without need for removal of residues of the hydrogenation metal from the product, and without deterioration of the molecular weight of the product or contamination by catalyst attrition or the like, and which is adapted for commercial operation.

SUMMARY OF THE INVENTION

We have now surprisingly found that a process for hydrogenation may be provided with use of a substantially attrition resistant catalyst which is not prone to formation of metal residues and which allows for intimate contacting of active hydrogenating metals or their precursors with organic macromolecular substrates, whereby reactions may be carried out at non-extreme conditions which are not deleterious in terms of the physical and chemical properties of the hydrogenated product, in particular reduction in molecular weight of the macromolecular substrates. Moreover the process may be employed for hydrogenative stabilization of unsaturated substrates or for hydrogenative conversion into other useful substrates.

In its broadest aspect there is provided according to the present invention a process for the hydrogenation of a macromolecular organic substrate comprising contacting the organic substrate at elevated temperature and pressure with a catalyst comprising a hydrogenating metal or precursor thereof in the form of a megaporous structure having megapore diameter in excess of 10 micron. The megaporous structure may be selected from any structure known in the art and preferably comprises structures providing maximum volume fraction of metal (precursor) in a thin sub-mm surface layer with a maximum of the remaining volume fraction available as void for substrate.

Preferred structures are those for which the optimum void fraction has been found to be available to substrate for any given thin layer catalytic metal volume. Preferably the structure comprises open-ended megapores providing optimum mass transfer and convection.

DETAILED DESCRIPTION OF THE INVENTION

Megaporous structures may comprise a carrier for the supported metal or may comprise the unsupported metal itself, for example shaped, with optional reinforcing as known in the art. The megaporous structure may be selected from any fixed bed structure comprising structured packing such as lateral flow, parallel passage, bead string packing and the like, or comprising a monolith, as disclosed in S. T. Sie, J. E. Naber, Parallel Passage and Lateral Flow Reactors, in Structural Catalysts and Reactors, ed. by A. Cybulski and J. A. Moulijn, and in "Monoliths in Heterogenous Catalysts", Cybulski et al, Catal. Rev. - Sci. Eng., 36(2), 179–270 (1994) and "Monolithic Ceramics and Heterogenous Catalysts: Honeycombs and Foams", Carty and Lednor, Solid Catalysts and Porous Solids, Current Opinion in Solid State & Materials Science 1996, 1:88–95, with extensive reviews of suitable support materials as known in the art, together with methods for the preparation thereof, the contents of which are incorporated herein by reference.

Suitable structures for use in the process are available commercially. Preferred forms for the catalyst include packed foils, such as spaced flat or corrugated foils which may be stacked or rolled, wire mesh honeycomb and foam monolith structures, and other structures having high mass transport.

Reference herein to macromolecular organic substrates is to any substrate having characteristic viscosity and molecular weight unsuited to intimate contacting in known heterogeneous systems. In particular substrates comprising natural or synthetic oligomers or polymers as the macromolecule or a part thereof and having a number average molecular weight (MW) of the order of at least 1000 are envisaged. It is a particular advantage of the present invention that the process is ideally suited for the hydrogenation in high quality of liquid phase, optionally dissolved, macromolecular substrates as herein before defined having number average molecular weights in the range of at least $1 \times 10^3$ to $1 \times 10^7$ or more, and with particular advantage in the range of $1 \times 10^5$ to $5 \times 10^5$. The viscosity of macromolecular substrates may be adapted by suitable selection of solvents and the like to minimize effects of polymer chain entanglement, weak chain interactions or ionic (H—) bonding and the like, but the process of the invention is of particular advantage for macromolecules of viscosity in the range of from 10 to 5000 cps at operating temperature, and particularly in the range of 100 to 500 cps at operating temperature.

The homogenous processes herein before described for hydrogenation of macromolecular substrates and the heterogeneous process hereinbefore described for hydrogenation of lower molecular weight substrates are thought to operate by a totally different mechanism to the heterogeneous process of the invention. In particular the homogenous catalysts may be expected to penetrate to great depths into macromolecular substrates. Accordingly it would be expected that attempts to reduce contamination of the product by metal residues from the catalyst by employing heterogeneous catalysts which are not prone to forming metal residues would be limited in their success due to steric hindrance restricting access of catalyst to sites for hydrogenation within the macromolecule. In particular this might be thought to be the case for molecules comprising polymers which are typically in the form of folded or otherwise reduced surface area chains.

Without being limited to this theory it is thought that the combined effects of the wetting or salvation by the macromolecular substrate or its solvent of the surface of the catalyst and the dynamic properties of the macromolecule, in particular chain like macromolecules such as natural and synthetic polymers, enable the macromolecule to unfold, lay down or open out onto the catalyst surface whereby substantially the entire theoretical surface area of the macromolecule is adapted to contact the catalyst surface.

Moreover it is thought that the macromolecules are restrained from entering micro-macropores of catalysts because of the molecular size and viscosity thereof, whereby the molecules may be expected to be associated with very low diffusion properties. However, it is thought that the megapores of the catalyst employed in the process of the invention provide for high mass transfer, whereby a degree of convection supplements diffusion into and out of megapores, facilitating contacting of the macromolecules with the hydrogenating metal. The selectivity illustrated in the process of the invention indicates that hydrogenation is indeed proceeding by catalytic means.

The process of the invention may be employed for selective or complete hydrogenation of any unsaturated macromolecular substrates as herein before defined for stabilization thereof or for conversion to new products having desired chemical and/or physical properties. The process is of particular advantage in hydrogenation of natural or synthetic substrates, such as polymers selected from conjugated diolefins and alkenyl aromatics and copolymers and functional derivatives thereof, polyketones, aromatic polyesters and polycarbonates and the like.

Conjugated diolefins include those containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like, of which isoprene and butadiene are in common usage for their low cost and ready availability. Alkenyl aromatic hydrocarbons include vinyl aryl compounds such as styrene, alkyl-substituted styrenes, alkoxy substituted styrenes, vinyl naphthalene, alkyl substituted vinyl naphthalenes and the like. Copolymers of diolefins and alkenyl aromatics comprise alkenyl aromatics random or block copolymerised with conjugated diolefins as hereinbefore defined. Conjugated diolefins and/or alkenyl aromatics as hereinbefore defined include also their functional derivatives comprising various functional groups such as hydroxy added randomly or at the ends of a branched or a star polymer; and mono-, di-, tri-block etc., polymers thereof. Preferred substrates are styrene containing polymers such as elastomers (including KRATON® polymers).

Polyketones include high molecular weight linear alternating polymers of carbon monoxide with olefin unsaturated compounds, which may comprise optional heteroatom, aromatic and/or cyclic groups and which are suited for conversion to the corresponding polyalcohol. Preferred are polymers of carbon monoxide with alpha or cyclic olefin, more preferably with an alpha olefin having at most 6 carbon atoms, for example ethene, propene, 1-butene and the like. Preferred polyketones are characterised by, for example, a number-average molecular weight (MW) in excess of 1000, or a limiting viscosity number of 0.2 to 5.0 dl/g, preferably 0.3 to 4.5 dl/g in metacresol at 60° C., or a melt temperature in the range of 150 to 270° C. determined by differential scanning calorimetry. Polyketones which are particularly suited to conversion by hydrogenation to the corresponding polyalcohol are commercially available as Carilon® polymer and Carilite® thermosetting resin having respective MW of about 10,000+ and of about 1000 to 5000.

The hydrogenation metal employed may include any known metal or combination thereof adapted for catalytic hydrogenation, typically comprising an element selected from Groups 7 to 11 of the Periodic Table of the Elements and mixtures thereof, optionally with additional metals, for example selected from Groups 1 to 6 and 12 to 14 of the Periodic Table. Preferably the hydrogenating metal is selected from one or more elements of Groups 8 to 11 of the Periodic Table, more preferably Fe, Co, Cu, Ni, Pd, Pt, Ru and mixtures thereof, optionally with further metals from Groups 6 and 7 of the Periodic Table, for example Cr. Metal(s) may be selected according to the desired selectivity and substrate to be hydrogenated.

The catalyst may comprise the catalytically active metal in any suitable amount to achieve the required level of activity. Typically, the catalyst comprises the active metal in an amount in the range from 0.01 to 100% by weight, preferably 0.01 to 20% by weight when supported on a carrier, more preferably from 0.1 to 10% by weight, most preferably from 1 to 7.5% by weight; or 80 to 100% by weight when substantially unsupported.

Techniques for shaping metals or supporting metals on porous structures are well known in the art, for example impregnation or (on a metal structure) electrolytic deposition. A most suitable technique for supporting the metal on the megaporous structure is impregnation. Preferably impregnation of the structure is with a solution of a compound of the catalytically active metal, followed by drying and calcining the resultant material. Where it is desired to introduce a mixture of metals or a mixture with additional metals as herein before defined, the impregnating solution may be a mixture of solutions of the respective metal salts combined in suitable amount for co-impregnation. Alternatively impregnation may be sequential, with first stage impregnation, drying and calcining with the catalytically active metal solution, and second stage impregnation of another metal which it is desired to impregnate, or vice versa.

Preferred techniques for impregnation are by dipping, painting, spraying, immersing, applying by measured droplet and the like of a suspension or solution of the catalytically active metal, with subsequent drying in hot air or the like and optionally calcining, in manner that a uniform impregnation is achieved. Preferably impregnation and/or drying is carried out in the absence of distorting gravitation, capillary effects during drying, which might provide an undesired gradient or total content of the impregnated metal. For example the megaporous structure may be rotated or suspended in manner that contact with any other objects does not encourage meniscus or capillary effects.

The hydrogenating metal is suitably impregnated in the form of its oxide or is converted to the oxide during the calcining step. Preferably the metal oxide is converted to its catalytically active form by reducing to the metal using techniques as known in the art. For example the catalyst may be loaded into the reactor and a stream of hydrogen passed over the catalyst at elevated temperature for a sufficient period to convert a sufficient quantity of the impregnated metal oxide to its metal form.

A megaporous structure as hereinbefore defined suitably comprises any substantially attrition resistant and temperature resistant material and is available commercially or may be prepared by techniques well known in the art. Examples of suitable materials include metals (for example steel and/or the hydrogenating metal itself); carbon; inorganic metal oxides such as silica, alumina, titania, zirconia and mixtures thereof (that is inorganic metal oxides comprising at least one cation, or at least two cations, being a binary oxide, ternary oxide, etc.); metal carbides; and nitrides and the like.

The at least one cation of an inorganic metal oxide support is preferably selected from Groups 2 to 4 and 12 to 14 of the Periodic Table of the Elements and the lanthanides. A mixed oxide may comprise two or more cations in any desired amounts preferably each independently in an amount of 1 to 99% wt, more preferably two cations in an amount of 1 to 50% and 50 to 100% wt respectively, most preferably in an amount of 15 to 25% and 85 to 75% wt, respectively. The oxide is suitably prepared by techniques as known in the art or is commercially available.

The megaporous structure comprises the catalytically active metal distributed over its surface area. Preferably the structure is provided with enhanced surface area, by means of a coating, wash coat or like layer of porous material introduced by techniques as known in the art. For example in "Monolithic Ceramics and Heterogeneous Catalysts" as hereinbefore referred to are disclosed techniques for the coating of foams with oxide layers which can be used to increase surface area or to alter surface compositions. Wash coating is typically with a layer of alumina, preferably by means of an alumina sol, or with perovskites, through coating the foams firstly with epoxy resin, then by infiltration with perovskite powder. The performance of wash coated carriers is found to give a 10% improvement over non wash coated carriers in terms of conversion.

The oxide support may comprise incidental amounts of other cations, present as a result of the synthesis thereof or for functional purpose.

The megaporous structure preferably comprises a large number of megapores as herein before defined. In this respect, the term "pore" is a general reference to a space or interstice in the fixed arrangement between two adjacent portions of the catalyst. Thus, in the case of a fixed bed comprising structured packing, the term "pore" refers to the space between two adjacent packing components. When referring to monoliths, the term pore refers to the openings or spaces between adjacent portions or lands of the monolith. Thus, it will be appreciated that the pores referred to in respect of the present invention have a nominal diameter of the order of magnitude of at least 10 micron, preferably of 0.1 to 10 mm. These are to be contrasted with pores which may be present in the megaporous structure material itself, which may be porous. Pore size may be selected according to the MW and viscosity of the substrate or solution thereof which it is desired to hydrogenate.

The megaporous structure preferably comprises up to 50 pores per linear inch (ppi) (20 pores per linear cm), more preferably from 10 to 30 ppi (4 to 12 pores per linear cm), especially from 12 to 25 ppi (5 to 10 pores per linear cm), for example about 20 ppi (about 8 pores per linear cm).

Any suitable reaction regime may be applied in the process of the present invention in order to contact the reactants with the catalyst. One suitable regime is a rotating bed in which the catalyst is employed in the form of a bed mounted on a rotor immersed in the substrate. An alternative reaction regime for use in the process is a fixed bed reaction regime in which the catalyst is retained within a moving stream of substrate in a reaction zone in a fixed arrangement.

The process is carried out at conditions of elevated temperature and pressure as herein before defined, suitably in the range of 40 to 400° C., preferably 80 to 200° C. and a pressure of hydrogen gas in the range 10 to 120 bar, preferably 40 to 80 bar. The reaction is suitably carried out as a batch, semi-batch, or continuous process under conditions and with residence time chosen for the desired selectivity and conversion of reaction.

The reaction is preferably carried out, as herein-before described with use of stirring of the reactor contents. In the case in which the catalyst is mounted on a rotor blade within the reactor, the reaction is suitably carried out at a rotor stirring speed in the range of 800 to 1200 rpm. In the case in which the catalyst is a fixed bed, the flow rate may be selected to achieve the desired selectivity and conversion of reaction.

The substrate to be hydrogenated in the liquid phase is suitably undiluted or diluted to achieve desired viscosity.

The catalyst and conditions may be adapted with reference to the nature of the substrate and depending on its temperature sensitivity, viscosity, and suitability for selective or complete hydrogenation and the like.

The reaction is terminated by cooling down and releasing the gas under pressure. The reactor contents are suitably removed into an inert container and solvent removed by techniques known in the art.

The invention is now illustrated in non limiting manner with reference to the following examples.

EXAMPLE 1

Examples of commercially available cylindrical (h50 mm, w55 mm) monolithic 20 ppi alumina foam were loaded with either 5% Ni or with 5% Cu. Further samples with increased specific surface area, comprised monolithic alumina foam with a 5 to 6% HPA washcoat, a blend of calcined hydrated alumina. The ceramic foam cylinders were dried at 120° C. for at least one hour prior to impregnation. Solutions of known concentrations of copper, nickel, and chromium nitrates were prepared and added to the ceramic foam in sufficient quantity to give the desired loadings. Addition of the solution was carried out partially dropwise and by immersing the foam in the solution. After each addition the foam was dried. The material was then placed in an oven equipped with a fan and dried/calcined using the following temperature profile: 4 h/120° C., heated at 50° C. to 500° C., maintained for 1 hour at this temperature, cooled to 120° C., and removed from the oven.

EXAMPLE 2

The monolithic alumina foam was mounted on the agitator of an autoclave. Nickel oxide was reduced to metal nickel by passing hydrogen over the foam at 200° C. At room temperature 160 grams of cement G-1650 precursor (MW 71600 SBS) in cyclohexane was added and the autoclave was pressurised with 60 bar hydrogen. The autoclave was heated to 120° C. reaction temperature and held for 8 hours. The reaction was terminated by cooling down the autoclave and venting the hydrogen. The autoclave was opened and the content poured into an aluminium cup. Solvent was evaporated on a steam bath and subsequently by vacuum at 30° C. overnight. Conversion and selectivity were determined by $^1$H-NMR spectroscopy. The same catalyst was reused for subsequent reactions, reduced for each condition.

GPC and ICP-MS analysis of the products from the experiment with the monolithic foam according to the above method, showed no degradation of the polymer had occurred and no nickel was leached from the monolithic support.

EXAMPLE 3

A 5% w nickel impregnated wash-coat foam was tested under the same conditions of Example 2 as the non-wash-coated foam. This wash-coat foam, with an increased surface area, converted polybutadiene for 72% and polystyrene for 33% at 120° C., 60 bar $H_2$ and 8 hrs reaction time. The overall performance of the nickel impregnated wash-coat foam is a relative 10% better than the non wash-coat foam.

EXAMPLE 4

Alumina monolithic foam impregnated with 5% w copper+0.005% w chromium was tested using the process of Example 2. This foam gave a similar hydrogenation of the polybutadiene but no hydrogenation of styrene was observed. Polybutadiene was converted for 60% in 7.5 hrs at 120° C., 60 bar $H_2$ and 1200 rpm.

EXAMPLE 5

Alumina monolithic foam impregnated with 1% w platinum (ex $PtCl_4$) was tested using the process of Example 2, employing a 180 grams of cement G-1650 precursor (MW 71,600 SBS) in cyclohexane. The hydrogen pressure was set at 50 bar.

After hydrogenation in most cases a two-phase system was formed after some time. Separation of the phases yielded different conversions for the phases. The phase having the highest conversion yielded a polymer having a polybutadiene conversion of >99% and a polystyrene conversion of >98%.

The invention shows that megaporous catalysts based on ceramic foams are able to hydrogenate SBS polymer without contaminating the product with metal residues.

EXAMPLE 6

Example 5 was repeated, however, using 160 grams of polystyrene (MW 35,000) in cyclohexane and applying a reaction temperature of 180° C. Full conversion was achieved in 8 hours.

The results of Examples 2 to 5 are shown in Table 1, in which in each experiment, run 1 is not recorded for fresh catalyst. In the Table X(s) and X(bd) indicate conversion or % hydrogenation of styrene and butadiene respectively.

EXAMPLE 7

The experiments were carried out with an $\alpha$-$Al_2O_3$ foam of 40 ppi pore size. The foam weighted 39.4 g and was shaped as a hollow cylinder of 4.3 cm inner diameter, 6.5 cm outer diameter, and 4.2 cm height. The foam was impregnated by 2 w % Ru(III) nitrosyl nitrate and calcined at 400° C.

The catalyst was mounted in a 300 ml autoclave that is equipped with an electrical heating jacket and agitated by a gas-distributing propeller. The catalyst was reduced for 17 h at 130° C. under 5 bar $H_2$ with regular purging and renewing of the $H_2$ gas phase.

The feed consisted of Carilite® EP, an alternating copolymer of CO and propylene of which 50% of the propylene has been substituted by ethene. The Carilite® polymer molecular weight was Mn=3502 and Mw=6956. 13.95 g of the Carilite was dissolved in 122.46 g of THF (tertrahydrofurane) and 13.29 g water. The whole mixture was pumped into the autoclave against 50 bar $H_2$ and at 150° C. within about an hour. The $H_2$ pressure was then raised to 90 bar and the reaction carried out for 17 hours with regular sampling of the liquid product.

At the end of the reaction the clear and colorless liquid was concentrated by evaporating the THF solvent and water under vacuum. The resulting white and sticky mass was then dissolved with an equivalent mass of $CD_3OD$ en an equivalent mass of $DCCl_3$ and analysed by Infrared spectroscopy using NaCl cell windows.

The conversion as measured by the ratio between the C=O stretching band around 1590 to 1800 $cm^{-1}$ and the C—H stretching bands around 2750 to 3050 $cm^{-1}$ reached already 94% after 2 hours of reaction and was completed after 17 h. In the same time a strong O—H stretching band developed at 3050 to 3700 $cm^{-1}$.

TABLE 1

Hydrogenation of SBS with monolithic foams

| Ex/run | time h | temp °C. | p ($H_2$) bara | [c] % w | mix rpm | X(bd) % | X(s) % | sel. X(s) X(bd) |
|---|---|---|---|---|---|---|---|---|
| Nickel impregnated foam | | | | | | | | |
| 2/1 | 4 | 120 | 40 | 10 | 1200 | 27 | 10 | 0.36 |
| 2/2 | 8 | 90 | 40 | 5 | 1200 | 28 | 13 | 0.49 |
| 2/3 | 8 | 90 | 40 | 10 | 800 | 21 | 9 | 0.41 |
| 2/4 | 8 | 120 | 60 | 5 | 800 | 64 | 41 | 0.63 |
| 2/5 | 4 | 120 | 40 | 10 | 1200 | 26 | 11 | 0.41 |
| Nickel impregnated washcoat foam | | | | | | | | |
| 3/1 | 4 | 120 | 40 | 10 | 1200 | 44 | 14 | 0.32 |
| 3/2 | 8 | 120 | 60 | 10 | 1200 | 72 | 33 | 0.46 |
| Copper impregnated foam | | | | | | | | |
| 4/1 | 7.5 | 120 | 60 | 10 | 1200 | 60 | 0 | |
| Platinum impregnated foam | | | | | | | | |
| 5/1 | 4 | 120 | 50 | 10 | 1200 | 39 | 24 | 0.62 |
| 5/2 | 4 | 160 | 50 | 20 | 1200 | 43 | 10 | 0.23 |
| 5/3 | 8 | 160 | 50 | 10 | 1200 | 58 | 43 | 0.74 |

From the results it is clear that monolithic foams impregnated with nickel are able to hydrogenate polybutadiene but also hydrogenate polystyrene to some extent. The monolithic foams impregnated with platinum were better able to hydrogenate the polystyrene. In Example 2 the ratio X(s):X(bd) remains between 0.4 and 0.6 which indicates that selectivity is independent of the reaction parameters.

Monolithic foams impregnated with copper gave, compared with nickel, a similar level of hydrogenation of polybutadiene but no hydrogenation of polystyrene. This indicates that selectivity can be determined by choice of metal.

We claim:

1. A process for the hydrogenation of a macromolecular organic substrate which process comprises contacting the organic substrate at elevated temperature and at elevated pressure with a catalyst comprising a hydrogenating metal or precursor thereof in the form of a megaporous structure having megapore diameter in excess of 10 micron.

2. A process according to claim 1 characterised in that the megaporous structure is a monolith and comprises packed foils.

3. A process according to claim 1 characterised in that the hydrogenation metal comprises an element selected from Groups 7 to 11 of the Periodic Table of the Elements and mixtures thereof, optionally with additional metals selected from Groups 1 to 6 and 12 to 14 of the Periodic Table.

4. A process according to claim 1 characterised in that the metal is present in an amount in the range from 0.01 to 100% by weight of catalyst.

5. A process according to claim 1 characterised in that the megaporous structure comprises a substantially attrition resistant and temperature resistant material selected from the group consisting of metals, carbon, inorganic metal oxides, metal carbides, and nitrides.

6. A process according to claim 5 characterised in that the megaporous structure comprises an inorganic metal oxide having at least one cation selected from Groups 2 to 4, and 12 to 14 of the Periodic Table of the Elements.

7. A process according to claim 1 characterised in that the catalyst is provided with enhanced surface area by means of a coating or wash-coat.

8. A process according to claim 1 characterised in that the fixed arrangement of the catalyst has pores in the range of from 0.1 to about 10.0 mm.

9. A process according to claim 1 characterised in that the macromolecular substrate or part thereof is selected from natural and synthetic oligomers or polymers having a molecular weight of $1 \times 10^3$ to $1 \times 10^7$.

10. A process according to claim 1 characterised in that the organic substrate is selected from conjugated diolefins and alkenyl aromatics and copolymers and functional derivatives thereof, polyketones, aromatic polyesters, and polycarbonates.

11. A process according to claim 1 characterised in that the substrate is contacted with the catalyst at a pressure in the range of 10 to 120 bar and a temperature in the range of from 40 to 400° C. with stirring or flow of reactor contents.

12. A process according to claim 11 wherein the pressure is 40 to 80 bar and the temperature is 80 to 200° C.

13. A process according to claim 2 wherein the structure is selected from the group consisting of flat or corrugated foils which may be stacked or rolled, wire mesh honeycomb, and foam monolith structures.

14. A process according to claim 4 wherein the metal is supported on a carrier and is present in an amount from 0.1 to 20%.

15. A process according to claim 4 wherein the metal is unsupported and is present in an amount from 1 to 7.5%.

* * * * *